United States Patent
Alinari

[15] 3,651,693

[45] Mar. 28, 1972

[54] DEPTH-MEASURING INSTRUMENT

[72] Inventor: Carlo Alinari, Corso Vittorio Emanuele 200, Turin, Italy

[22] Filed: Mar. 20, 1970

[21] Appl. No.: 21,329

[30] Foreign Application Priority Data

Mar. 22, 1969 Italy....................................51062 A/69

[52] U.S. Cl................................................73/300, 73/406
[51] Int. Cl...........................................................G01f 23/14
[58] Field of Search....................73/300, 431, 406; 58/90 R

[56] References Cited

UNITED STATES PATENTS 2,986,038  5/1961  Corny..................................73/300 X
2,914,949  12/1959  Hastings..................................73/406
3,394,594  7/1968  Pooley....................................73/406
2,935,873  5/1960  Stewart...................................73/300
3,279,646  10/1966  Kuramoto..........................73/431 UX Primary Examiner—Louis R. Prince
Assistant Examiner—Daniel M. Yasich
Attorney—Sughrue, Rothwell, Mion, Zinn & Macpeak

[57] ABSTRACT

A depth-measuring instrument of the membrane type has a metallic disc membrane deformations of which are recorded by a pointer on a scale. The disc is flat and is freely supported at its edge on a seat on which it is movable when it flexes, and is covered by a flexible wall of an outer case so that ambient pressure is transmitted to the disc through this wall.

3 Claims, 3 Drawing Figures

PATENTED MAR 28 1972

3,651,693

INVENTOR

BY

ATTORNEY

DEPTH-MEASURING INSTRUMENT

The present invention relates to depth-measuring instruments, especially for measuring depth underwater.

Depth-measuring instruments, usually described as depth meters, are known which comprise a casing having an interior space which is separated from fluid at an ambient pressure corresponding to the depth to be measured by an elastically deformable membrane, and a mechanism for converting deformation of the membrane resulting from ambient pressure changes into movement of a pointer cooperating with a graduated scale. Such instruments are referred to herein as being "of the type described".

As a rule, very thin corrugated membranes of metallic alloy are used in instruments of this type, the membranes exhibiting a substantially linear deformation characteristic, that is, a deformation which is directly proportional to the depth. The membrane is usually fixed at its edge by brazing or the like to a seat so that this edge is rigidly held. The flexibility of the membrane arises from its corrugations. Since its deformation is linear with pressure, it is not possible to graduate the scale for accurate readings over a very large depth range.

The membranes of this type also suffer from the disadvantage of limited mechanical strength. Consequently the use of such a membrane is possible only within a limited range of depths; subjecting the membrane to a depth in excess of the upper limit of this range induces permanent plastic deformation of the membrane, rendering the instrument subsequently useless.

Moreover instruments of the aforesaid type, because of their fragility, tend to be complex and costly in construction.

An object of the present invention is to obviate these disadvantages by providing an instrument of the said type, which is capable of withstanding pressure corresponding to large depths without being subject to permanent deformation, whilst still retaining a depth-measuring capability.

A further object of the invention is to provide an instrument which provides depth readings at small depths of high accuracy, and depth readings to a good approximation at greater depths.

The present invention provides a depth-measuring instrument of the type described which is characterised in that the membrane comprises an elastic metallic disc with its edge resting freely upon an annular seat in the said casing, the disc being enclosed within a sealed outer case having a flexible wall which is easily deformable which is placed over the disc in contact therewith to transmit to the disc the ambient pressure corresponding to the depth to be measured. The disc is preferably flat and is made of steel such as spring steel.

The invention will now be described, by way of non-limiting example, with reference to the accompanying drawing, in which.

Figure 1:
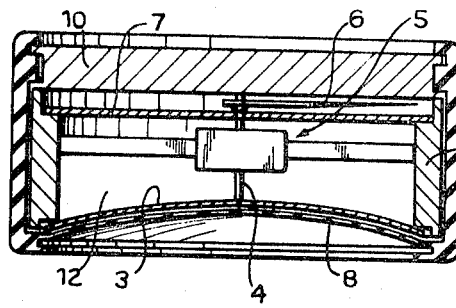
FIG. 1 is a schematic axial section of an instrument for the measurement or depths according to one embodiment of the present invention.
Figure 2:
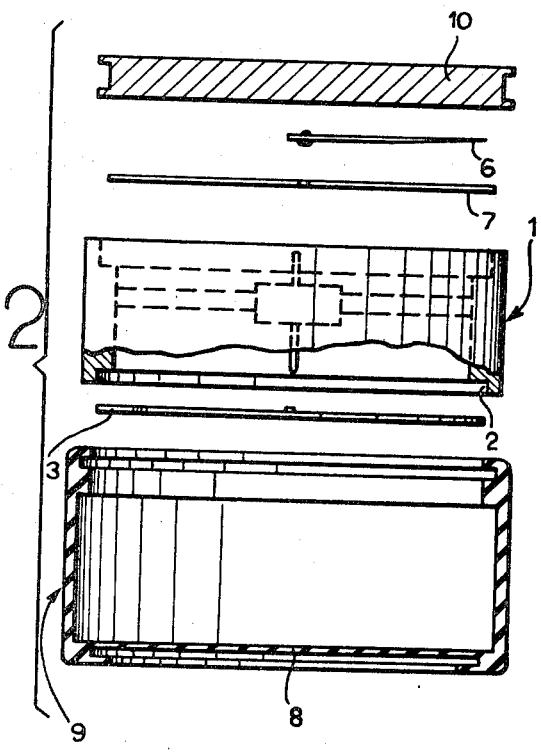
FIG. 2 is a blown-up schematic axial section of the instrument of FIG. 1.

Referring to the drawing, the instrument according to the invention comprises a rigid casing made up of a tubular wall 1 which has at one end a recessed annular seat 2. A circular elastically deformable membrane comprising a metallic disc 3, preferably comprising a sheet of spring steel which, as seen in FIG. 2, is flat when unstressed, and rests freely on the seat 2.

At its center, the disc 3 is connected to a rod 4, which leads to a mechanism 5, of known type, carried within the rigid casing wall 1 and adapted to convert axial movements of the center of the disc 3, resulting from distortion of the latter, into corresponding arcuate movements of a pointer 6 about an axis coaxial with the disc 3. The pointer 6 cooperates with a fixed scale 7 carried by the casing wall 1 and graduated in units of depth (e.g., meters).

The entire assembly of parts described above is enclosed within a sealed outer case 9 which in the example illustrated is made up of elastically deformable material, such as, for example, rubber, closed at one end by an integral very flexible thin wall 8, adapted to lie on the disc 3 in order to transmit to it the external ambient pressure. At its other end the case 9 is closed by a transparent cover 10, which engages in annular grooves in the internal surface of the cylindrical wall of the case 9 and is sealed to said wall.

The case 9 is generally provided with means (not shown) which permit attachment of the instrument to a user's wrist.

The case 9, the casing wall 1, and the mechanism 5 may be of a different type from that described, in accordance with the particular construction of the instrument.

The hermeticity of sealing of the case 9 prevents any infiltration of water into the interior of the instrument, especially around the edges of the disc 3 which, as stated previously, merely rest upon the seat 2.

The disc 3 behaves as a leaf spring and deflects inwardly at its center when it is uniformly loaded by reason of the external pressure transmitted through the wall 8 from the fluid, usually water, in which the instrument is immersed. Being free at its edge, it moves relatively to the seat 2 when flexing.

The volume of the interior space 12 of the instrument should be such as to prevent the deformation of the disc 3 from appreciably influencing the pressure in the space 12.

For greater safety and reliability, the interior space 12 of the instrument can be evacuated. This renders the interior pressure insensitive to variations of temperature.

The deformable disc 3 has a very high mechanical resistance, which allows widening of the range of use of the instrument, making it suitable for measuring very high pressures corresponding to large depths, without corresponding changes in the sensitivity or accuracy of the instrument.

Use of the metallic disc 3 as an elastically deformable membrane as herein described simplifies considerably both the construction and assembly of the instrument.

Figure 3:
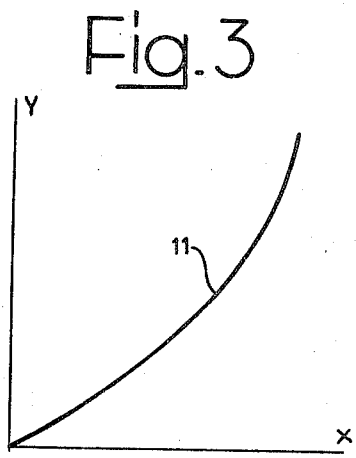
FIG. 3 is a diagram illustrating graphically the deformation X of the elastic disc of the instrument as a function of the depth Y at which the instrument is located.

The working characteristic of the instrument is illustrated graphically in FIG. 3: the curve 11 represents the deformation (x axis) of the elastic disc 3 as a function of the pressure (Y axis) and consists of one branch 11 of a parabola. The rate of deformation of the disc 3 for a given pressure change decreases as the pressure (depth) increases: this enables one to have a very exact reading of depth at small depths, because of the greater sensitivity of the instrument at small depths, and a sufficiently approximate reading of depth at greater depths, corresponding to greater pressures.

Naturally, the details of construction of practical embodiments of the invention may be widely varied with respect to what has been described and illustrated, without going outside the scope of the present invention as defined in the appended claims.

I claim:

1. A depth gauge comprising an inner casing and an outer casing, said inner casing defining an interior space, seat means on said inner casing, an elastically deformable metal disc having the peripheral edge freely disposed on said seat means whereby the edge of the disc is free to move on the seat means upon deformation of said disc, a pointer and a graduated scale disposed in said interior space and means for converting deformation of said metal disc as a result of a pressure change in ambient fluid outside said casing into movement of said pointer over said graduated scale, said outer casing disposed about said inner casing in a sealed manner, said outer casing having a flexible wall coextensive with said disc whereby the pressure of ambient fluid along said outer casing is transmitted to said disc through said flexible wall.

2. A depth gauge as set forth in claim 1 wherein said disc is normally flat.

3. A depth gauge as set forth in claim 2 wherein said disc is formed of spring steel.

* * * * *